(12) United States Patent
Huang

(10) Patent No.: US 11,383,779 B1
(45) Date of Patent: Jul. 12, 2022

(54) SWINGING LOCKING MECHANISM FOR BICYCLE RACK AND BICYCLE RACK HAVING THE SAME

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 0 days.

(21) Appl. No.: 17/140,344

(22) Filed: Jan. 4, 2021

(51) Int. Cl.
*B60R 9/10* (2006.01)
*B62H 5/00* (2006.01)
*B62H 3/00* (2006.01)

(52) U.S. Cl.
CPC ............... *B62H 5/005* (2013.01); *B60R 9/10* (2013.01); *B62H 3/00* (2013.01)

(58) Field of Classification Search
CPC ............................... B60R 9/10; Y10S 224/924
USPC ................. 224/924, 518–521, 495, 502–509
See application file for complete search history.

(56) References Cited

U.S. PATENT DOCUMENTS

| 9,987,998 | B2 * | 6/2018 | Shen ..................... B60R 9/06 |
| 10,183,627 | B1 * | 1/2019 | Liu .......................... B60R 9/06 |
| 10,384,620 | B2 * | 8/2019 | Prescott ................ B60R 9/06 |
| 10,906,473 | B1 * | 2/2021 | Yu ........................... B60R 9/06 |
| 11,148,607 | B1 * | 10/2021 | Hsieh ................... B60R 9/045 |

FOREIGN PATENT DOCUMENTS

WO WO-0020254 A1 * 4/2000 ............... B60R 9/06

* cited by examiner

*Primary Examiner* — Scott T McNurlen
(74) *Attorney, Agent, or Firm* — Muncy, Geissler, Olds & Lowe, P.C.

(57) ABSTRACT

A swinging locking mechanism configured to be mounted to a bicycle rack includes a movable rod configured to be movably mounted to a pivot seat of the bicycle rack, and an operating member. The movable rod defines an axial direction and includes at least one second engaging portion which is releasably engaged with at least one first engaging portion of the pivot seat. The operating member is connected with the at least one second engaging portion, and an operational direction of the operating member is parallel to the axial direction. The bicycle rack including the swinging locking mechanism is further provided, and further includes: a carrying frame, having at least one of the pivot seat and configured to carry at least one bicycle. The movable rod is transverse to the carrying frame and configured to restrict the at least one bicycle.

7 Claims, 6 Drawing Sheets

SWINGING LOCKING MECHANISM FOR BICYCLE RACK AND BICYCLE RACK HAVING THE SAME

BACKGROUND OF THE INVENTION

Field of the Invention

The present invention relates to a swinging locking mechanism and a bicycle rack having the same.

Description of the Prior Art

The conventional bicycle rack includes a carrying frame and at least one vertical post connected to the carrying frame, and the carrying frame is for carrying at least one bicycle. The at least one post is provided with at least one holder for holding the at least one bicycle and avoiding shaking the at least one bicycle during transportation.

The vertical post of the conventional bicycle rack is fixed to the carrying frame, and the operating space is narrow and it is not conducive to the loading and unloading of the bicycle. Therefore, the pivotal mechanism of the vertical post is developed to allow the vertical post to swing and collapse relative to the carrying frame. However, the conventional pivotal mechanism has a complex structure, and is not conducive to assembly and operate.

The present invention is, therefore, arisen to obviate or at least mitigate the above-mentioned disadvantages.

SUMMARY OF THE INVENTION

The main object of the present invention is to provide a swinging locking mechanism and a bicycle rack having the same which are simple in structure and easy to operate.

To achieve the above and other objects, the present invention provides a swinging locking mechanism, configured to be mounted to a pivot seat of a bicycle rack, the pivot seat including at least one first engaging portion, the swinging locking mechanism including: a movable rod, configured to be movably mounted to the pivot seat, defining an axial direction and including at least one second engaging portion which is releasably engaged with the at least one first engaging portion, the at least one second engaging portion being movable between a locking position and a release position; and an operating member, connected with the at least one second engaging portion, an operational direction of the operating member being parallel to the axial direction; wherein when the at least one second engaging portion is located in the locking position, the at least one second engaging portion and the at least one first engaging portion are engaged with each other, and the movable rod is non-swingable relative to the pivot seat; when the operating member operates to drive the at least one second engaging portion to be located in the release position, the at least one second engaging portion and the at least one first engaging portion are disengaged from each other, and the movable rod is swingable relative to the pivot seat.

To achieve the above and other objects, the present invention further provides a bicycle rack includes at least one said swinging locking mechanism and further including: a carrying frame, including at least one said pivot seat and configured to carry at least one bicycle, the movable rod is arranged lateral to the carrying frame and configured to restrict the at least one bicycle.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
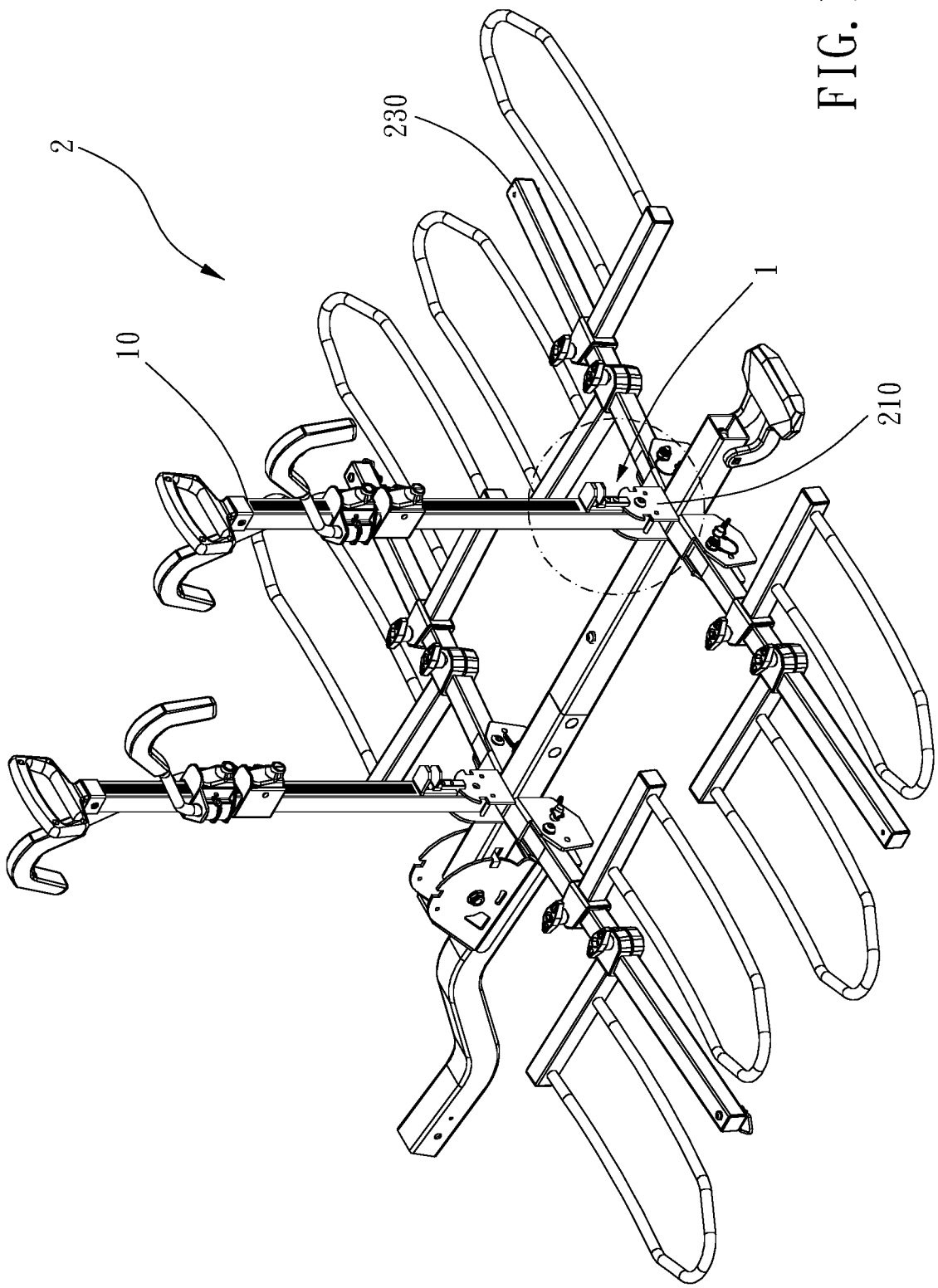
FIG. 1 is a stereogram of a preferable embodiment of the present invention.

Please refer to FIGS. 1 to 6 for a preferable embodiment of the present invention. A swinging locking mechanism 1 of the present invention is configured to be mounted to a pivot seat 210 of a bicycle rack 2, the pivot seat 210 includes at least one first engaging portion 220, and the swinging locking mechanism 1 includes a movable rod 10 and an operating member 20.

The movable rod 10 is configured to be movably mounted to the pivot seat 210, the movable rod 10 defines an axial direction and includes at least one second engaging portion 11 releasably engaged with the at least one first engaging portion 220, and the at least one second engaging portion 11 is movable between a locking position and a release position. The operating member 20 is connected with the at least one second engaging portion 11, and an operational direction θ of the operating member 20 is parallel to the axial direction A. When the at least one second engaging portion 11 is located in the locking position, the at least one second engaging portion 11 and the at least one first engaging portion 220 are engaged with each other, and the movable rod 10 is non-swingable relative to the pivot seat 210. When the operating member 20 operates to drive the at least one second engaging portion 11 to be located in the release position, the at least one second engaging portion 11 and the at least one first engaging portion 220 are disengaged from each other, and the movable rod 10 is swingable relative to the pivot seat 210, which is easy to control the operating member 20, and has a simple structure.

The movable rod 10 further includes a blocking member 12, the blocking member 12 includes a blocking portion 121 extending radially, and at least one of the at least one second engaging portion 11 and the operating member 20 the blocking portion 121 is blockable by the blocking portion 121 on the operational direction θ. The blocking member 12 further includes a guiding portion 122 extending in the axial direction A, and the at least one second engaging portion 11 is movably mounted to the guiding portion 122, which provides stable movement of the at least one second engaging portion 11 in the axial direction A. In this embodiment, the blocking portion 121 is a plate member extending lateral to the axial direction A, for sufficiently blocking the operating member 20. The guiding portion 122 includes at least two arms 123 arranged in interval, and the at least two arms 123 extend in the axial direction A and define at least one guiding slot 124 receiving the at least one second engaging portion 11. Each said guiding slot 124 is open in a direction toward the pivot seat 210 for allowing engagement of the at least one second engaging portion 11 the at least one first engaging portion 220. Preferably, the at least two arms 123 integrally extend bendingly from the blocking portion 121, which is simple and strong in structure and easy to assembly. In other embodiment, one of the guiding portion and the at least one second engaging portion may include at least one guiding protruding portion, and the other of the guiding portion and the at least one second engaging portion may include a guiding groove within which the at least one guiding protruding portion is slidably disposed; the guiding portion and the blocking portion may be disposed on the movable rod.

Preferably, the operating member 20 includes a connecting portion 21 connected with the at least one second engaging portion 11, the connecting portion 21 is abutted against at least one of the guiding portion 122 and the movable rod 10 in a direction lateral to the axial direction A, which restricts the operating member 20 to move stably along the operational direction θ. In this embodiment, the connecting portion 21 is detachably connected with the at least one second engaging portion 11, thus being easy to assembly/disassembly, repair and replace. The connecting portion 21 includes two tabs 211 located at two sides of the at least one second engaging portion 11, and the two tabs 211 are abutted against the two arms 123 in a direction lateral to the axial direction A, thus being good in guiding and position-limitation. The operating member may be integrally connected with the at least one second engaging portion. The two tabs may be abutted against the movable rod.

Figure 2:
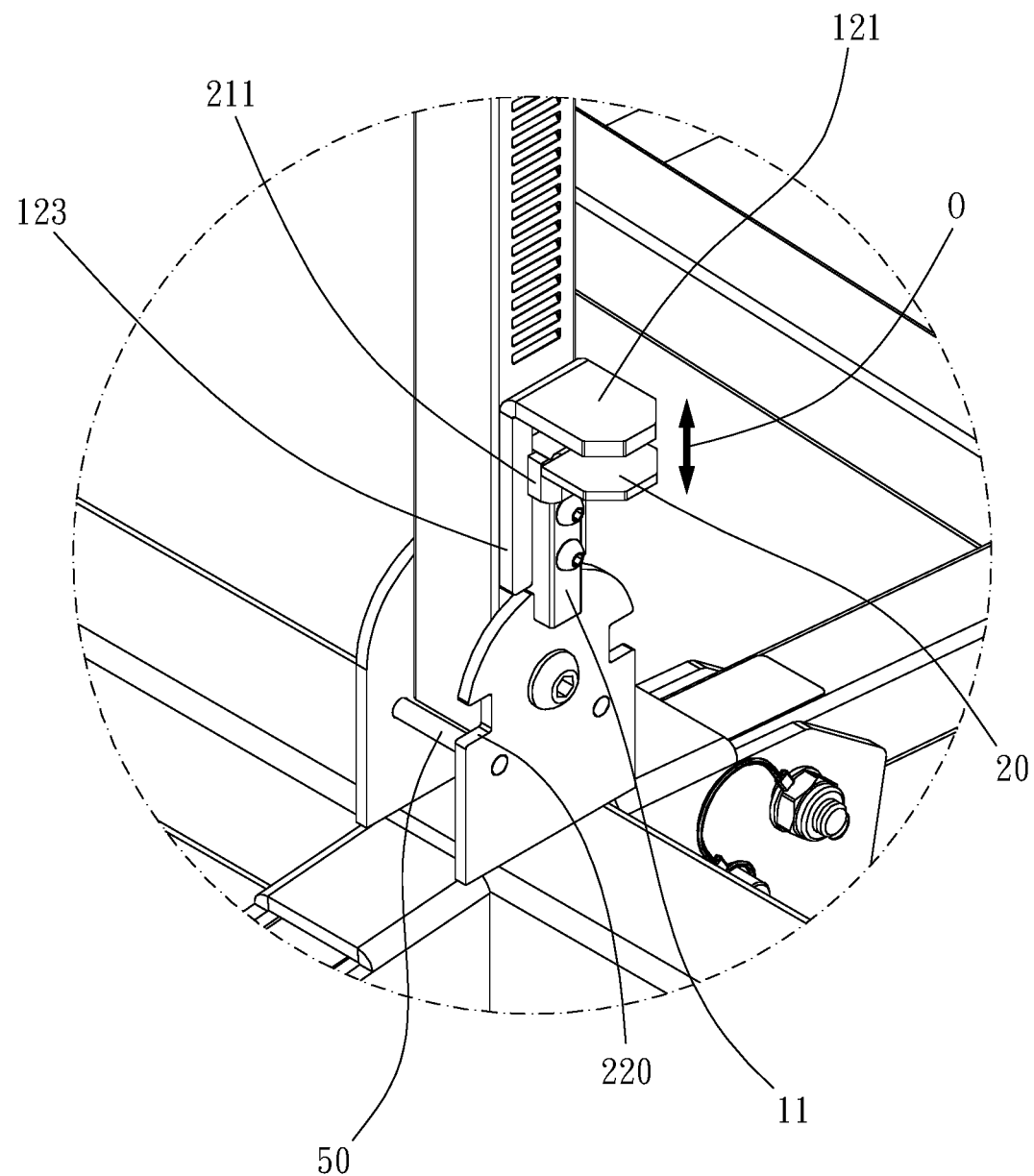
FIG. 2 is a partial enlargement of FIG. 1.
Figure 3:
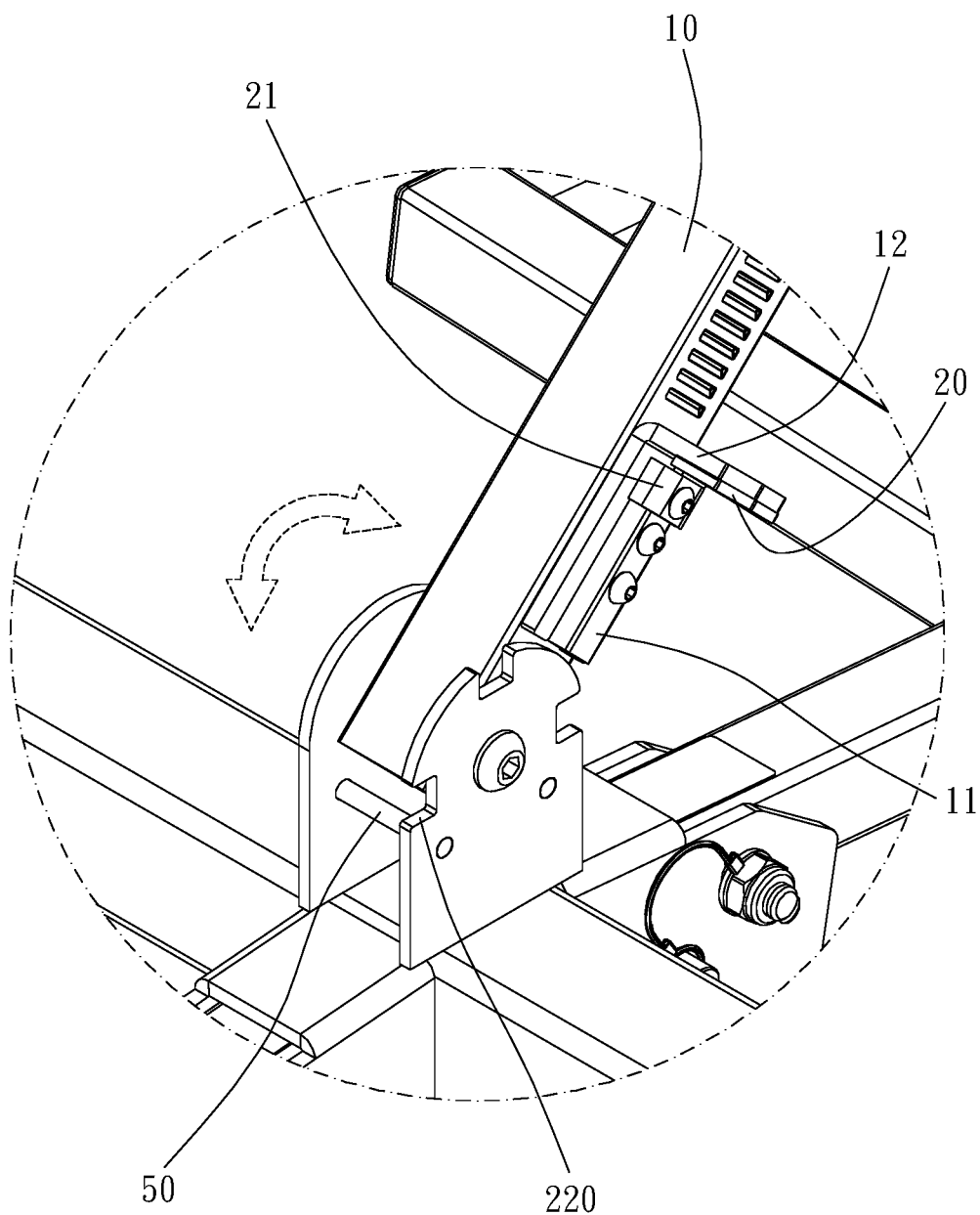
FIG. 3 is a drawing showing operation of a preferable embodiment of the present invention.
Figure 4:
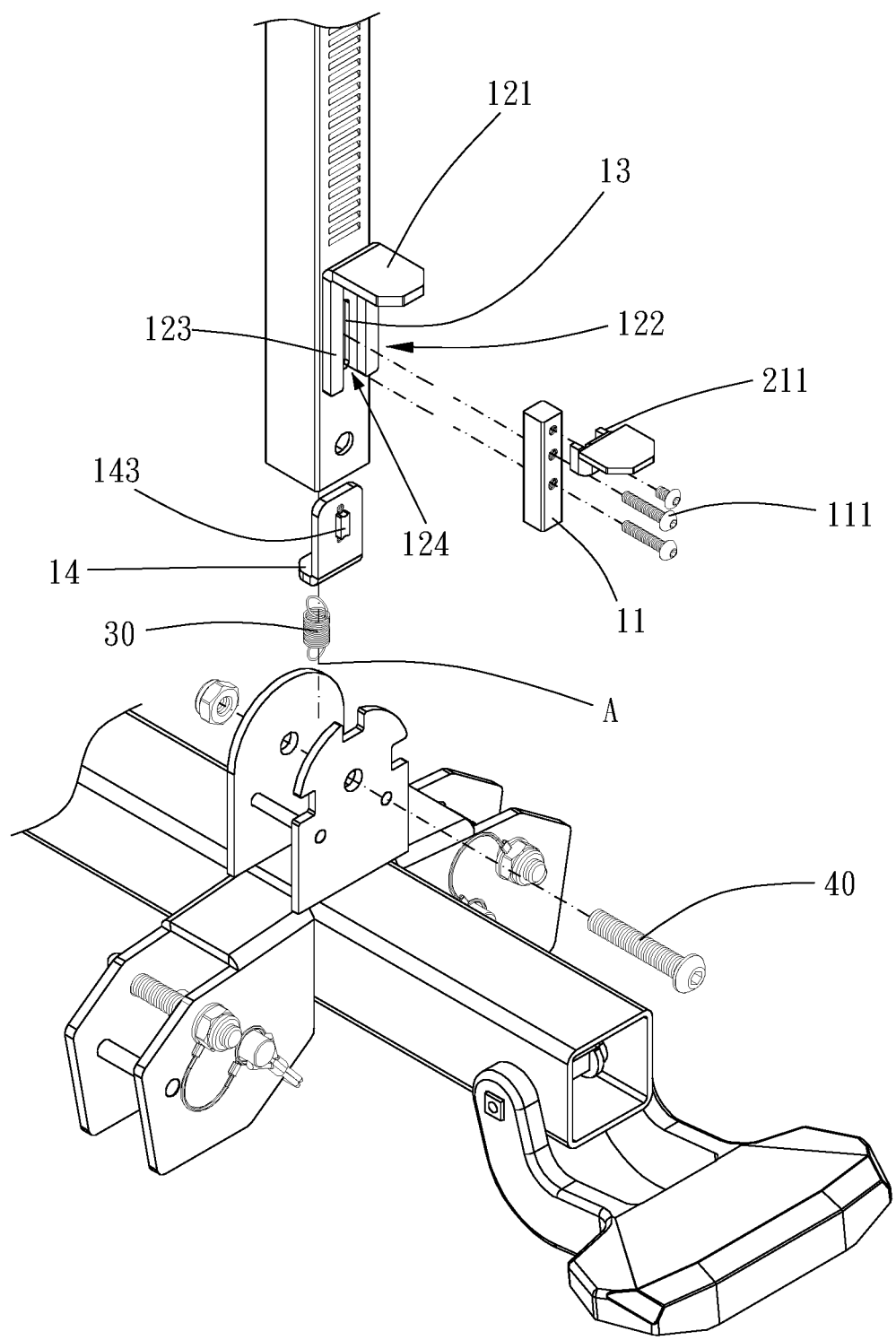
FIG. 4 is a partial breakdown drawing of a preferable embodiment of the present invention.
Figure 5:
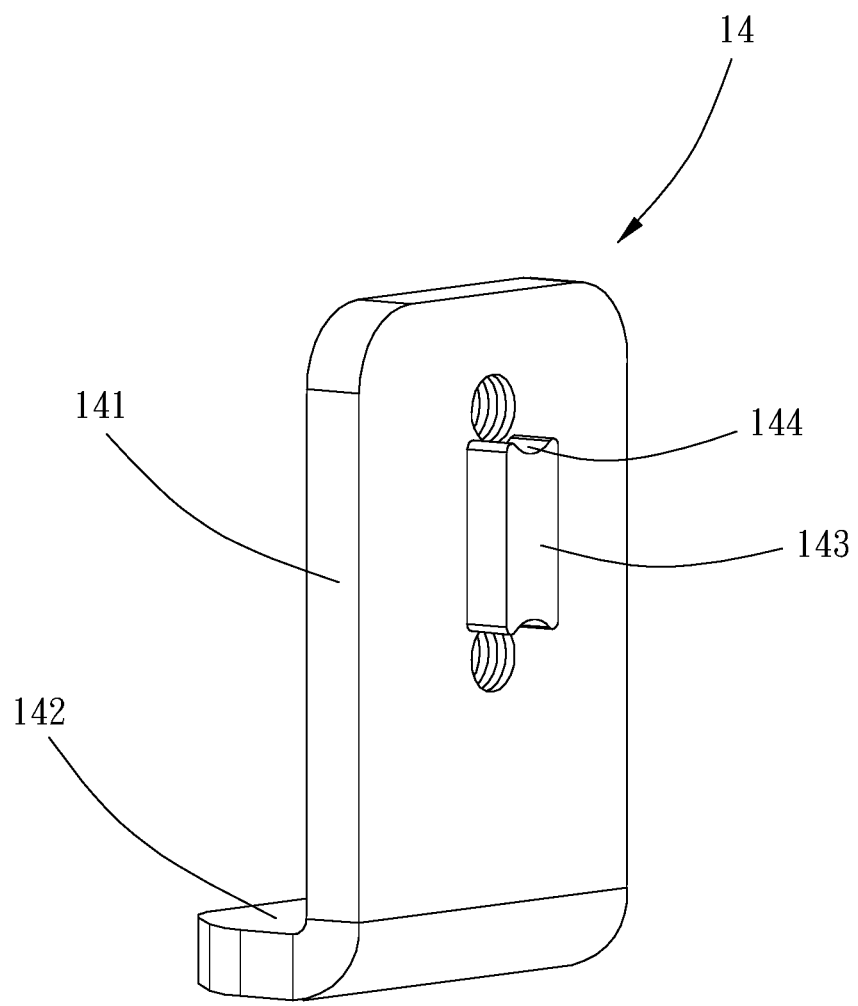
FIG. 5 is a stereogram of a connecting member of a preferable embodiment of the present invention.
Figure 6:
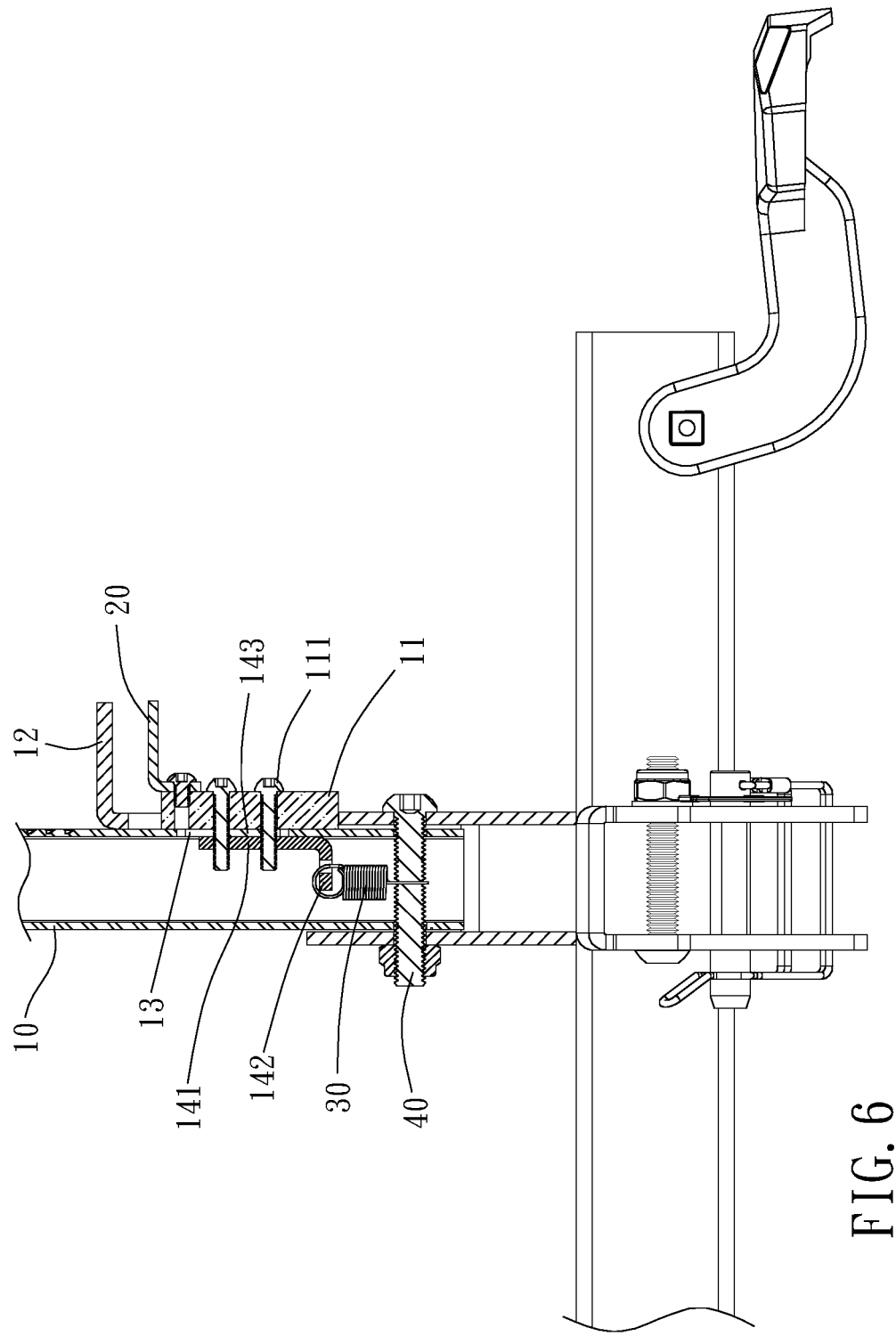
FIG. 6 is a partial cross-sectional view of a preferable embodiment of the present invention.

The swinging locking mechanism 1 further includes an elastic member 30, and the movable rod 10 is a tubular member and pivoted to the pivot seat 210 by a shaft 40. The movable rod 10 includes at least one positioning slot 13, the at least one second engaging portion 11 includes at least one limitation member 111 slidably inserted within the at least one positioning slot 13, and the elastic member 30 is disposed between the shaft 40 and the at least one limitation member 111, so that the at least one second engaging portion 11 is biased to move toward the locking position. Preferably, the movable rod 10 further includes a connecting member 14 disposed therein. The at least one limitation member 111 is connected with the at least one second engaging portion 11 and the connecting member 14, and the elastic member 30 is connected between the connecting member 14 and the shaft 40. Specifically, the connecting member 14 includes a first portion 141 and a second portion 142 connected laterally, the at least one limitation member 111 is connected with the first portion 141, and the elastic member 30 is connected between the second portion 142 and the shaft 40, so as to ensure the acting force of the elastic member 30 is parallel to the operational direction θ for better force transmission. As shown in FIGS. 2 and 3, the at least one second engaging portion 11 is normally urged by the elastic member 30 and keeps in the locking position; when the operating member 20 is forced to move toward the blocking portion 121, the operating member 20 drives the at least one second engaging portion 11 to move to the release position, and the movable rod 10 is swingable relative to the pivot seat 210.

In this embodiment, the at least one second engaging portion 11 includes a plurality of said limitation members 111. Each said limitation member 111 is a threaded rod screwed to the at least one second engaging portion 11 and the connecting member 14, and thus it is simple in structure and easy to assembly/disassembly. One of the connecting member 14 and the at least one second engaging portion 11 includes at least one spacing member 143 located within the at least one positioning slot 13. Each said spacing member 143 is located between neighboring two of the plurality of said limitation members 111, which prevents wobble of each said limitation member 111 and ensures smooth moving of the at least one second engaging portion 11. Each said spacing member 143 includes a concave face 144 facing toward one of the plurality of said limitation members 111, providing good abutment and restriction. It is noted that the swinging locking mechanism may be provided without the connecting member, the elastic member may be directly connected with one of the plurality of said limitation members, and the elastic member may be directly connected between the movable rod and the connecting member. The elastic member may be disposed between the blocking member and the at least one second engaging portion. Each said limitation member may be a column protruding from the at least one second engaging portion and connecting the at least one second engaging portion and the connecting member by a screw and a nut, a pin and a c-shaped retainer, or the like.

The swinging locking mechanism 1 further includes at least one supporting member 50 configured to be mounted to the pivot seat 210. Each said supporting member 50 is abutted against the movable rod 10 on a swinging direction of the movable rod 10, which can distribute force exerted on the at least one first engaging portion 220 and the at least one second engaging portion 11 and prolongs service life. In this embodiment, each said supporting member 50 is a beam connected between two side walls of the pivot seat 210 and adjacent one of the at least one first engaging portion 220, and stably abutted against and the movable rod 10. It is noted that each said supporting member may be a bump member, blocking plate or the like.

A bicycle rack 2 is further provided. The bicycle rack 2 includes at least one said swinging locking mechanism 1, and further includes a carrying frame 230. The carrying frame 230 includes at least one said pivot seat 210 and configured to carry at least one bicycle, and the movable rod 10 is arranged lateral to the carrying frame 230 and configured to restrict the at least one bicycle. Whereby, for loading or unloading the bicycle, the operating member 20 is pressed to drive the at least one second engaging portion 11 to move to the release position so that the movable rod 10 is swingable to be folded, which is convenient to operate and provide a large space for operating.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A swinging locking mechanism, configured to be mounted to a pivot seat of a bicycle rack, the pivot seat including at least one first engaging portion, the swinging locking mechanism including:
   a movable rod, configured to be movably mounted to the pivot seat, defining an axial direction and including at least one second engaging portion which is releasably engaged with the at least one first engaging portion, the at least one second engaging portion being movable between a locking position and a release position; and
   an operating member, connected with the at least one second engaging portion, an operational direction of the operating member being parallel to the axial direction;

wherein when the at least one second engaging portion is located in the locking position, the at least one second engaging portion and the at least one first engaging portion are engaged with each other, and the movable rod is non-swingable relative to the pivot seat; when the operating member operates to drive the at least one second engaging portion to be located in the release position, the at least one second engaging portion and the at least one first engaging portion are disengaged from each other, and the movable rod is swingable relative to the pivot seat;

wherein the movable rod further includes a blocking member, the blocking member includes a blocking portion extending radially, and at least one of the at least one second engaging portion and the operating member is blockable by the blocking portion in the operational direction;

wherein the blocking member further includes a guiding portion extending in the axial direction, and the at least one second engaging portion is movably mounted to the guiding portion;

wherein the operating member includes a connecting portion connected with the at least one second engaging portion, and the connecting portion is abutted against at least one of the guiding portion and the movable rod in a direction transverse to the axial direction.

2. The swinging locking mechanism of claim 1, wherein the guiding portion includes at least two arms arranged in interval, and the at least two arms extend in the axial direction and define at least one guiding slot receiving the at least one second engaging portion.

3. The swinging locking mechanism of claim 2, wherein the at least two arms integrally extend bendingly from the blocking portion; the connecting portion includes two tabs located at two sides of the at least one second engaging portion, the two tabs are abutted against the two arms in a direction transverse to the axial direction; the swinging locking mechanism further includes at least one supporting member configured to be mounted to the pivot seat, each said supporting member is abutted against the movable rod in a swinging direction of the movable rod; the swinging locking mechanism further includes an elastic member, the movable rod is a tubular member and pivoted to the pivot seat by a shaft, the movable rod includes at least one positioning slot, the at least one second engaging portion includes at least one limitation member slidably inserted within the at least one positioning slot, and the elastic member is disposed between the shaft and the at least one limitation member; the movable rod further includes a connecting member disposed therein, the connecting member includes a first portion and a second portion connected transversely, the at least one limitation member is connected with the first portion, the elastic member is connected between the second portion and the shaft; the at least one second engaging portion includes a plurality of said limitation members, one of the connecting member and the at least one second engaging portion includes at least one spacing member located within the at least one positioning slot, each said spacing member is located between neighboring two of the plurality of said limitation members; each said spacing member includes a concave face facing toward one of the plurality of said limitation members.

4. The swinging locking mechanism of claim 1, further including at least one supporting member configured to be mounted to the pivot seat, wherein each said supporting member is abutted against the movable rod in a swinging direction of the movable rod.

5. The swinging locking mechanism of claim 1, further including an elastic member, wherein the movable rod is a tubular member and pivoted to the pivot seat by a shaft, the movable rod includes at least one positioning slot, the at least one second engaging portion includes at least one limitation member slidably inserted within the at least one positioning slot, and the elastic member is disposed between the shaft and the at least one limitation member.

6. The swinging locking mechanism of claim 5, wherein the movable rod further includes a connecting member therein, the at least one limitation member connects the at least one second engaging portion and the connecting member, and the elastic member is connected between the connecting member and the shaft.

7. A bicycle rack, including at least one said swinging locking mechanism of claim 1, further including:
a carrying frame, including at least one said pivot seat and configured to carry at least one bicycle, the movable rod is arranged transverse to the carrying frame and configured to restrict the at least one bicycle.

* * * * *